July 31, 1951 N. L. OATES 2,562,364
FISH SEGREGATOR FOR FEED TABLES
Filed April 22, 1946 4 Sheets-Sheet 3

INVENTOR.
NORFORD L. OATES
BY
Reynolds+Beach
ATTORNEYS

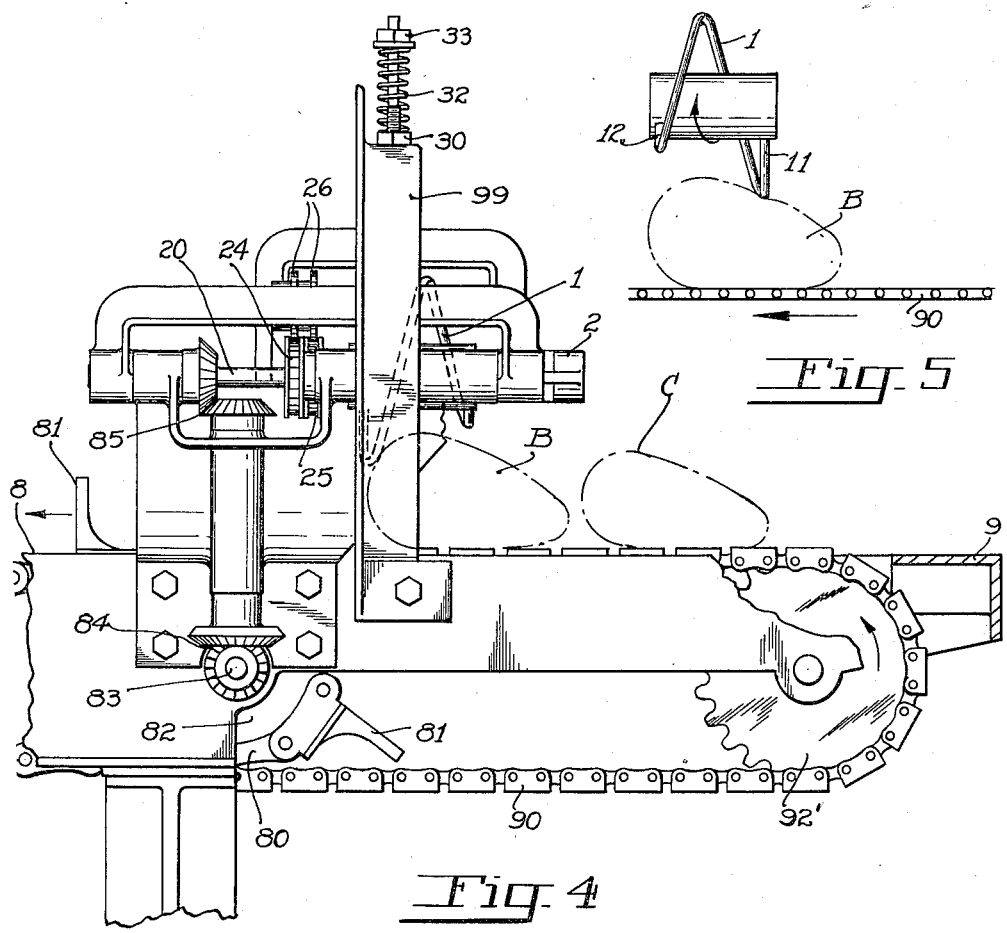
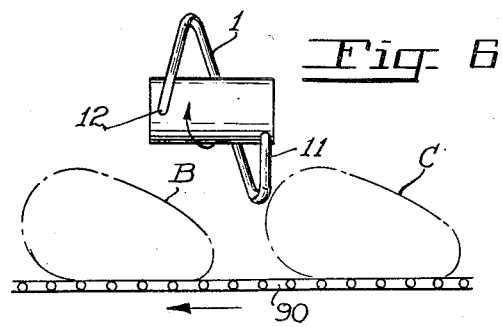
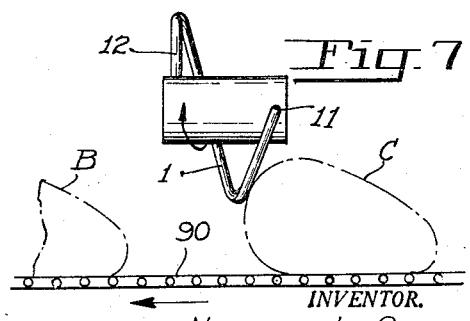

Patented July 31, 1951

2,562,364

UNITED STATES PATENT OFFICE 2,562,364

FISH SEGREGATOR FOR FEED TABLES

Norford L. Oates, Seattle, Wash., assignor to Smith Cannery Machines Company, Seattle, Wash., a corporation of Washington Application April 22, 1946, Serial No. 664,101

6 Claims. (Cl. 198—34)

Fish for commercial canning, salmon in particular, are advanced along a feed table at spaced intervals to a beheading station, where they are beheaded preparatory to passing through a fish cleaning and dressing machine. A feed table suitable to this end is shown in my copending application Serial No. 641,893, filed January 18, 1946 and now Patent No. 2,507,810 granted May 16, 1950, though the present invention is not restricted to use only with this particular feed table. On such a feed table each individual fish is acted upon by aligning means to bring it into precise alignment with the beheading knife by the time it arrives at the beheading station. Proper operation of the feeder table, and of the fish cleaning and dressing machine, is only possible when the fish are individually segregated and spaced from one another along the feed table, and are correctly disposed with heads all at one side of the table, and tails at the other side, and with their bellies rearmost. It has been the custom heretofore so to arrange the fish, and to engage them with the positive feed means on such feed tables, by hand.

The fish are delivered from a hopper or by a chute to the feed table, or within reach of the operator there, and since they arrive in a rather jumbled condition, and collectively rather than singly, the operator there must reverse some fish end for end, so that all the heads are disposed at one side of the feeder table, and any fish which are not disposed transversely of the table must be slewed around, so that they are thus disposed transversely. Some must be flopped over, to dispose the belly rearwardly. Then, holding back the remainder, the operator heretofore has been under the necessity of shoving one fish at a time into the range of the positive feed elements on the feeder table, at the same time taking care that the fish is kept in rough alignment with distant means whereby it is aligned accurately with the beheading knife. Ninety to a hundred or more fish must be so handled and fed, every minute.

These multifarious duties imposed upon the operator at this point are sometimes more than he can adequately perform, particularly over long shifts. Sometimes a fish will be fed a little too late, and must wait until the next positive feed elements arrive and engage it; to the extent that this happens the capacity of the fish dressing machine, and of the fish canning machinery, and of all the other machines in the production line, is reduced. Unless the fish are properly located, material wastage ensues. It follows that the operator, at the feed point, should have fewer duties to perform, and these duties should be simplified, to the end that they will be more certainly and accurately performed, and the feed of the fish will remain continuous and uninterrupted. The provision of means to these general ends is the primary aim of the present invention.

It has been found that while the operator can straighten out the fish, and arrange them all with their heads toward one side of the feed table, and their bellies rearward, without undue difficulty, his principal difficulty arises from attempting to do all these things and at the same time to feed one fish at a time, each at the proper short time interval, into position for engagement by the positive feed means of the feed table. Accordingly, it is an object of the present invention to provide means, timed with the feed table, and especially adapted to the uses and conditions of such feedtables, which will hold back one or more collected and preliminarily arranged fish, and will automatically segregate from these held-back fish one fish at a time, and advance each such segregated fish in timed relationship, so that it will automatically be engaged by the positive feed means of the feed table, to the ultimate end that the feed of fish along the feed table and through the fish dressing machine will be regularized.

Fish vary in size, and one fish may be larger than average and the next may be smaller. The range may be from four or five pounds minimum, in commercial salmon, up to perhaps twenty pounds. Accordingly, the segregating means must be such as will automatically adapt itself to random sizes of fish, and will hold back all fish until it is time to properly segregate and free for advance one such fish, regardless of its size or the size of the largest and the smallest fish, respectively, among those held back.

Since the fish are disposed transversely of the feed table while they are advanced, and will vary in length and in breadth, as well as in thickness, it is a further object to provide segregating means which not only adapt themselves to different thicknesses and lengths of fish, but which, engaging the fish at points spaced along its length, will effect proper feed of any length of fish that may be expected to be handled.

It is also an object to provide a machine of this nature which is readily adapted to handling larger or smaller fish, particularly since they vary in breadth.

It is also an object to provide mechanism of the general character indicated, which shall be simple, rugged, and reliable in operation, for such machinery is installed in remote cannery locations, where facilities for repair or replacement are not always adequate.

With these and other objects in mind, as will appear hereinafter, my invention comprises the novel mechanism and the novel parts thereof, as shown in the accompanying drawings, described in the following specification, and as will be more particularly pointed out by the claims which terminate the same.

The drawings show the mechanism in a typical form, such as is at preesnt preferred by me, but it will be understood that various changes may be made in the form, character, and relative arrangement of the parts, within the scope of the invention as defined by the claims.

Figure 4 is a side elevation of the feed station, parts being broken back.

Figures 5, 6, and 7 are diagrammatic views, illustrating, respectively, an initial stage in segregation, a later stage, and a still later stage.

Figure 1:
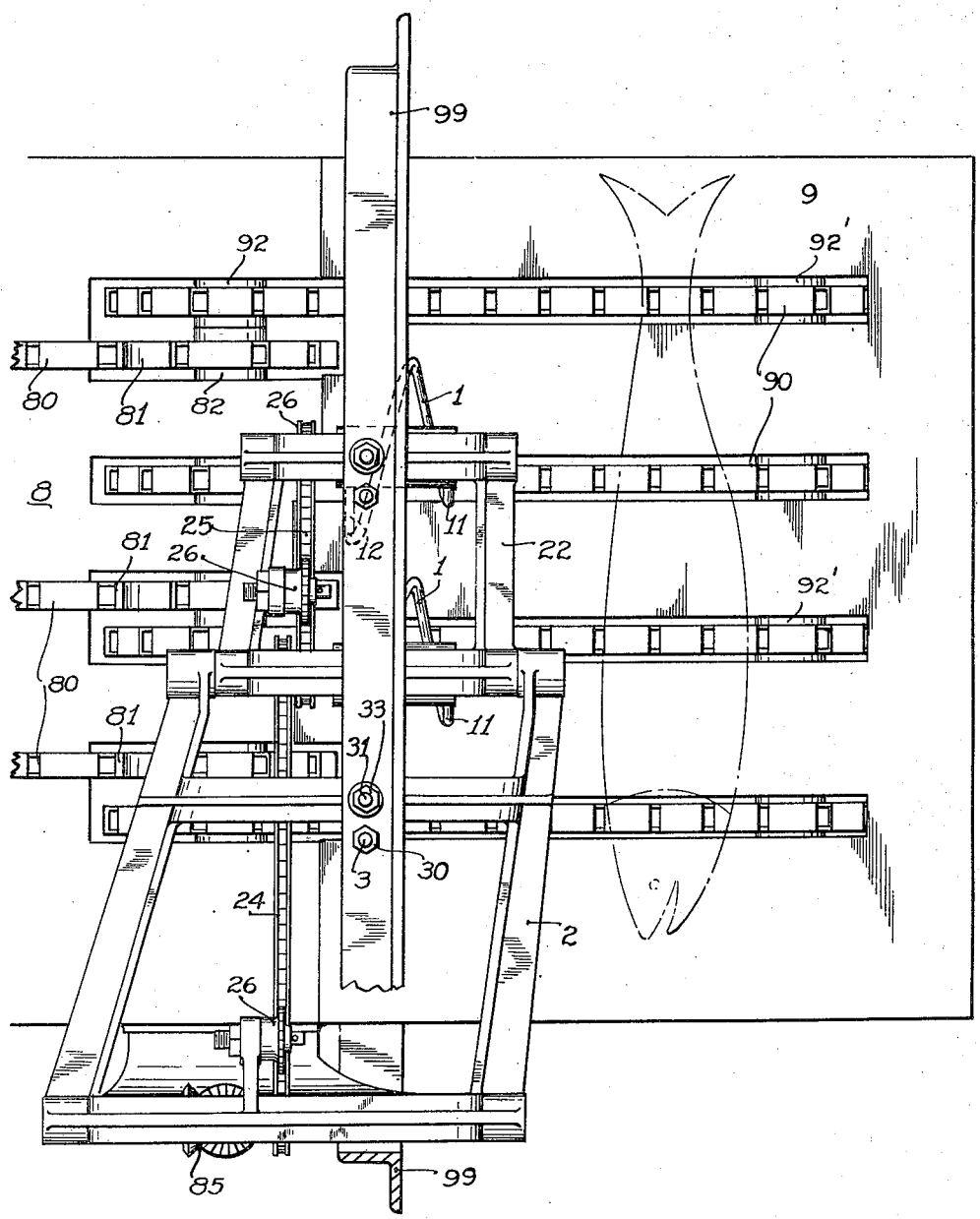
Figure 1 is a plan view of the feed station.

In Figure 1, at the right, is a preliminary arranging table 9, to which fish are delivered from a table (not shown) that receives them from a chute, hopper, or similar source (also not shown). At the left is a feed table 8 employing feed chains 80 having upstanding lugs 81 for positive feed of the fish, and such a feed table is or may be similar to that which is disclosed in my application Serial No. 641,893, already referred to. The table 9 has impositive fish-advancing means, such as the belts or chains 90, which parallel the feed chains 80 of the feed table 8, and which extend sufficiently far into the feed table to advance the fish from the table 9 into the range of the feed means 80, 81 of the feed table 8. For instance, the chains 80 and 90 may be mounted upon sprocket wheels, such as the wheels 82 and 92, respectively, upon the common shaft 83, so that both are driven at the same time and at the same speed, and thereby is insured that the chains 90 will carry the fish within the range of the lugs 81. At the opposite end of the table 9 idler sprocket wheels 92' support the feed chains 90. By this or any similar arrangement fish which are upon the table 9 are urged (though impositively, since the chains 90 have no upstanding lugs) in the direction to advance them to the point where they can be picked up by the individual fish advancing means 81 of the feed table 8.

Figure 2:
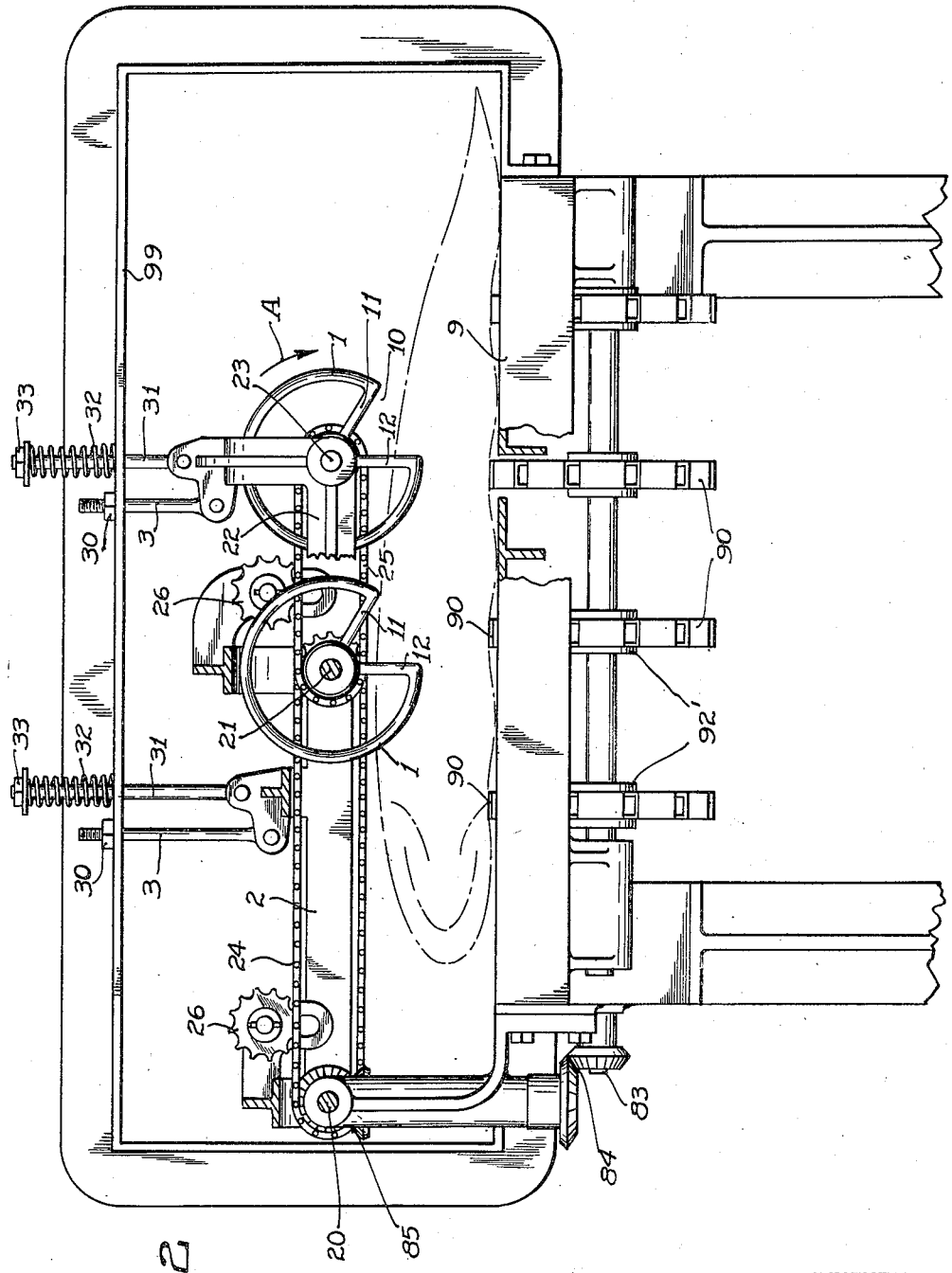
Figure 2 is an end elevation, partly broken away, of the preliminary arranging table, with parts in one position of adjustment.

Since the chains 90 continuously so urge all the fish upon the table 9, and since the operator is well occupied with proper arrangement of the fish, which are fed at the rate of perhaps eighty, ninety, or a hundred a minute, it is imperative to provide means to hold back the one or two fish which the operator will usually try to keep collected and ready upon the table 9, so that they will be advanced to and along the feed table one at a time. They will have been preliminarily arranged on the table alongside the table 9. Segregating means are provided, so located as to hold the ready fish out of range of the positive advancing means 81, and to release them for advance into the range of these means one at a time, and in timed relationship to the movement of these lugs 81. Such segregating means, of which preferably there are at least two spaced lengthwise of the fish, take the form, in the present embodiment, of helices 1, which extend preferably not quite a full 360 degrees. Thus, as is best shown in Figure 2, a gap 10 is left between the radial arm 11 at the lead side of the helix and the radial arm 12 at the outlet side thereof. These helices are supported above the table for rotation in the direction of the arrow A.

Any convenient means of thus supporting and rotating the helices may be employed, so long as the means permit their adjustment to accommodate different sizes of fish. Thus, an arm 2 is pivoted to swing about the axis represented by the shaft 20, and at its outer end journals the shaft 21, whereon is mounted the first or head end helix 1. A second arm 22 is pivoted coaxially with the shaft 21, and at its outer end carries the shaft 23 to which the second helix 1 is secured. Each such arm 2 and 22 is supported from an overhead frame 99, so that it is limited in its downward movement under the influence of gravity, to stop at a minimum point above the table 9. For instance, bars 3, provided with adjustable stops 30, suspend each arm 2 or 22 from the frame. In addition it is desirable to provide spring means to support a part of the load, so that fish in passing will not be required to lift the entire load of the segregator, to which end rods 31, connected to the respective arms 2 and 22, extend upwardly through the overhead frame 99, and springs 32, interposed between the upper ends of these rods 31 and the frame, support a material part of the load of the segregator mechanism. The part of the load thus assumed is variable by the adjusting means 33.

The helices 1 must be rotated in synchronism with one another and with the lugs 81. The shaft 83 which carries the sprocket wheels 82, about which the chain 80 is mounted, is connected by positive drive means, represented by the bevel gears 84 and 85, with the shaft 20. Chains 24, carried by suitable sprocket wheels on the shaft 20 and on the shaft 21, effect positive rotation of the first of the segregators 1, and a similar chain 25, upon sprocket wheels upon the shafts 21 and 23, effects positive drive of the second or tail end segregator 1. Tighteners 26 serve to maintain the chains properly tightened and to prevent them from jumping off the drive sprockets.

In Figure 4 two fish have been represented in dot-dash outline, as they might rest upon a preliminary arranging table. The fish B is on its way through the segregator. The fish C, urged on by the chains 90, is following close behind it. Ordinarily there would not be more than two fish resting upon the table 9, but should there be another, it will crowd behind the fish C. The objective is to keep at least one fish moving past the segregators 1, and another which is held back by the segregators, while a third is being made ready to shove onto the table 9.

Figure 3:
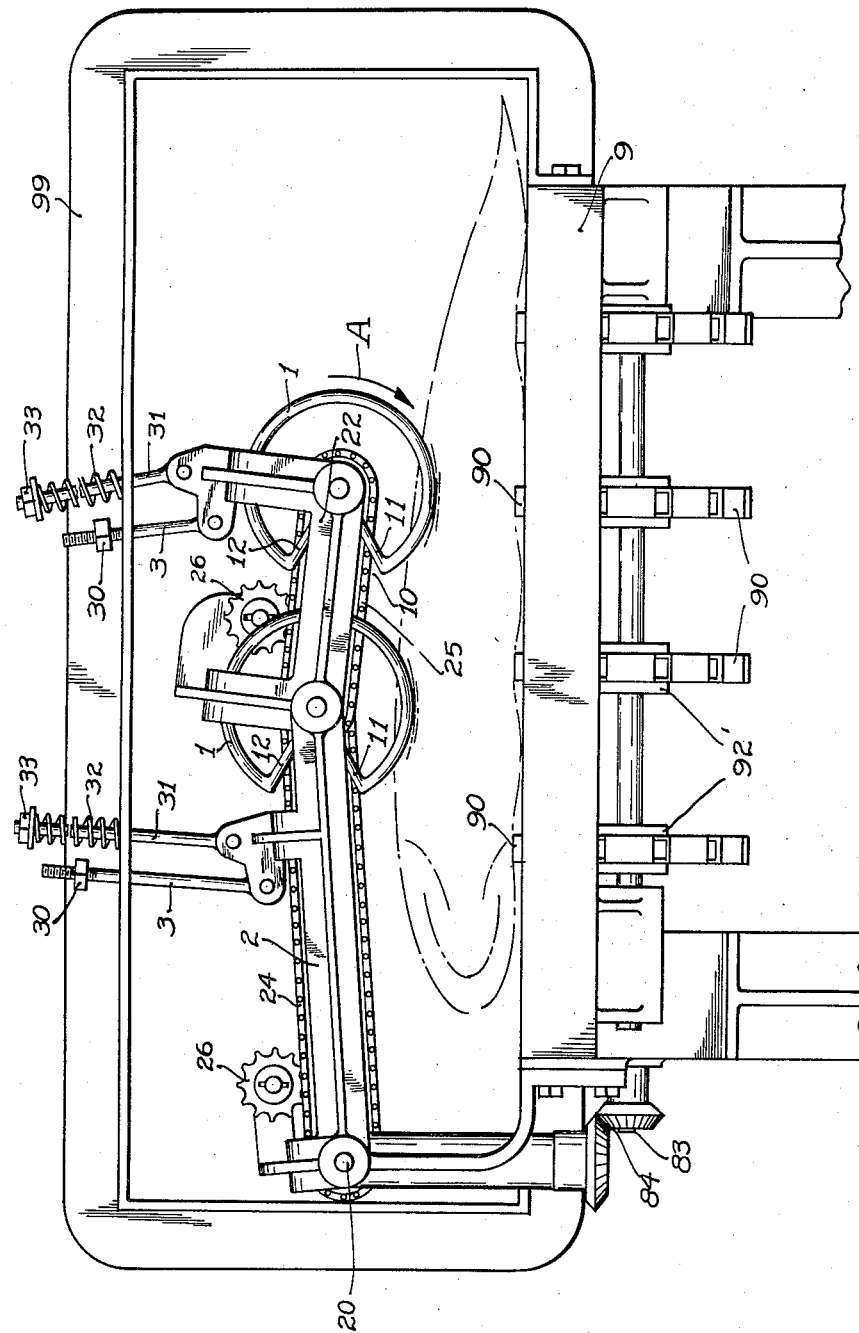
Figure 3 is a similar view with parts in a different relative position, such as they would assume during the segregation of a fish.

The fish B is shown in Figure 4 as it is about to be received within the gap 10 of the segregators, and in Figure 5 as it is passing through that gap. The segregators (see Figure 3) are raised somewhat to accommodate the thickness of the fish. Now as the fish C reaches the segregator, as shown in a slightly later stage in Figure 6, the segregators will have rotated far enough to bring the advancing arm 11 of each substantially vertical, to intercept the fish C, and while the chain 90 urges the fish C ahead, the helical portions of the segregators 1 hold the fish C back, and permit it to advance only at a slower rate, as indicated in Figure 7 in a somewhat later stage. Meanwhile the preceding fish B is not held back, and the chain 90 continues to advance it, so that it spaces out ahead of the fish C, and arrives within the range of action of the chain 80 and its lugs 81 just in time to be picked up by the lugs 81, and to continue its advance at the same rate. Meantime the segregator has held back the fish C (and all fish behind it, if any) but has permitted slow advance of the fish C, until, finally passing through the gap 10, the fish C is freed from restraint, in the same manner as was the fish B, as already described. By this time the next fish has been intercepted by the radial arm 11 of the segregators, and now it is held back, while the fish C advances in its attained spaced relation to the fish B, as the latter has advanced before it. Each fish is thus spaced out just the proper distance with relation to those preceding and those following it. Now all the operator has to do is to present fish within the range of the chains 90 ahead of the time they are needed, and to arrange them belly rearward and heads all at one side of the table in advance of so presenting them. He is no longer required to time the presentation of the fish, nor to retain any uniform periodicity of presentation.

Fish will vary in length as well as in thickness, and the relatively articulated mounting of the two segregators enables them to adjust individually to these differences, and yet to move more or less together to accommodate themselves to different sized fish as they arrive at the segregating point. While only two such segregator helices are shown, it is not outside the scope of the invention to employ more than this number, if desired.

As fish vary in length and thickness, they will also vary in breadth, and for narrower fish the helices 1 should be of lesser pitch and length, than for wider fish. Different helices may be employed interchangeably, and the substitution of one for another is readily accomplished. This does not alter the timing of the segregators. Now, with helices of small pitch for small fish, there is no probability of two fish crowding through at a time, as they might were the larger pitch helices used. Contrariwise, the longer pitch helices used with larger fish will better span the greater thickness and breadth of such larger fish, than would helices of smaller size.

While this particular style of segregator is simple and effective, the present invention is concerned broadly with the employment of segregating means to hold back all fish except one, which one is segregated and freed for advance, thus to space the fish out uniformly, and to advance them into position to be engaged by the positive feed means; and so, while the form of segregator shown is believed to be important, and is a part of the present invention, the invention in its broad aspect is not to be restricted to the particular form shown.

I claim as my invention:

1. In combination with a supporting table, and with at least two impositive conveyor means disposed in the general plane of the table and spaced transversely thereof to engage a succession of individual, transversely-disposed fish each simultaneously towards its head end and also towards its tail end, to advance such fish lengthwise of said table, means disposed above the path of such fish and depending into such path, in position to engage each fish substantially simultaneously towards its head end and also towards its tail end, formed and arranged to hold back the most advanced and all following fish, and also formed and operable to segregate from all others the most advanced of the held-back fish, and to free it for advance alone, in spaced relationship behind the preceding fish.

2. In combination with a supporting table, and with at least two impositive conveyor means disposed in the general plane of the table and extending in parallelism lengthwise thereof for advancing a succession of individual, random-size, transversely-disposed fish lengthwise of said table, a plurality of means disposed transversely of and above said table, in position to engage each fish of whatever size substantially simultaneously at a like number of points in its length, each formed and arranged to hold back the most advanced fish and all following fish, and cooperable during advance of a preceding fish to segregate from the held-back fish the most advanced thereof, and to free it for advance alone, in spaced relationship behind the preceding fish.

3. In combination with a supporting table, and with impositive conveyor means in the general plane of the table for advancing a succession of individual, random-size, transversely-disposed fish lengthwise of said table, a plurality of means disposed transversely of and above said table, in position to engage each fish of whatever size substantially simultaneously at a like number of points in its length, each formed and arranged to hold back the most advanced fish and all following fish, and cooperable during advance of a preceding fish to segregate from the held-back fish the most advanced thereof, and to free it for advance alone, in spaced relationship behind the preceding fish, and means mounting said segregating means for conjoint and limited independent up and down movement towards and from the table, and yieldingly urging each towards the table, to intercept the smallest size of fish to be fed.

4. In combination, a table whereon to support a plurality of fish, to allow their preliminary arrangement, transversely of the table, and with their heads all at one side of the table, means urging said fish, so arranged, to advance lengthwise of the table, two helices arranged side-by-side above the table with their axes paralleling the fishes' direction of advance, means supporting each helix and limiting its approach towards the table, to dispose it in position to intercept the smallest sized fish, but yieldable upwardly to accommodate fish of greater thickness, and means to rotate the helices conjointly, to segregate individual fish from those intercepted, and to free such segregated fish in turn for advance in spaced relation to previously and subsequently segregated fish.

5. The combination of claim 4, wherein the helix-supporting means are independently self-adjusting to fish of different sizes, and also are joined for conjoint movement.

6. In combination, a table whereon to support a plurality of fish, to allow their preliminary arrangement, transversely of the table and with their heads all at one side of the table, means urging said fish, so arranged, to advance lengthwise of the table, two helices arranged side-by-side above the table with their axes paralleling the fishes' direction of advance, a first arm pivotally mounted upon and extending transversely of the table, upon the swinging end of which one helix is journaled, a second arm pivotally mounted upon the swinging end of said first arm, upon the outer end whereof the second helix is journaled, drive means extending along said arms in turn, for rotating both said helices, and means to limit downward movement, but permitting conjoint and also independent movement of each arm and its helix, to segregate and then to free for advance individual fish, and to hold back the remainder.

NORFORD L. OATES.

REFERENCES CITED

The following references are of record in the file of this patent:

UNITED STATES PATENTS

| Number | Name | Date |
| --- | --- | --- |
| 1,209,801 | Beckett | Dec. 26, 1916 |
| 1,333,065 | Douglass | Mar. 9, 1920 |
| 1,343,417 | Steere | June 15, 1920 |
| 1,667,991 | Russell | May 1, 1928 |
| 1,828,168 | Ayars | Oct. 20, 1931 |
| 1,892,627 | Pearson | Dec. 27, 1932 |
| 2,078,503 | Meiser | Apr. 27, 1937 |
| 2,152,970 | Ness | Apr. 4, 1939 |
| 2,259,748 | Hullhorst | Oct. 21, 1941 |
| 2,285,267 | Gantzer | June 2, 1942 |
| 2,371,926 | Schmitt | Mar. 20, 1945 |